US009662597B1

(12) United States Patent
Formoso et al.

(10) Patent No.: US 9,662,597 B1
(45) Date of Patent: May 30, 2017

(54) METHODS AND SYSTEMS FOR HANDLING RAW OIL AND STRUCTURES RELATED THERETO

(71) Applicant: NANA WorleyParsons LLC, Anchorage, AK (US)

(72) Inventors: Daniel J. Formoso, Chugiak, AK (US); Charles L. Clark, Anchorage, AK (US); Erling J. Young, Anchorage, AK (US)

(73) Assignee: NANA WORLEYPARSONS LLC, Anchorage, AK (US)

( * ) Notice: Subject to any disclaimer, the term of this patent is extended or adjusted under 35 U.S.C. 154(b) by 0 days.

(21) Appl. No.: 15/158,977

(22) Filed: May 19, 2016

Related U.S. Application Data

(60) Provisional application No. 62/305,880, filed on Mar. 9, 2016.

(51) Int. Cl.
| | | |
|---|---|---|
| *E21B 43/34* | (2006.01) | |
| *B01D 19/00* | (2006.01) | |
| *B60P 3/22* | (2006.01) | |
| *E04C 2/292* | (2006.01) | |

(52) U.S. Cl.
CPC ..... *B01D 19/0057* (2013.01); *B01D 19/0063* (2013.01); *B60P 3/22* (2013.01); *E04C 2/292* (2013.01); *E21B 43/34* (2013.01)

(58) Field of Classification Search
CPC ................................. E21B 43/00; E21B 43/34
See application file for complete search history.

(56) References Cited

U.S. PATENT DOCUMENTS

| | | | | |
|---|---|---|---|---|
| 2,845,125 A | * | 7/1958 | Truman | E21B 43/12 166/52 |
| 3,025,928 A | * | 3/1962 | Heath | B01D 19/00 95/18 |
| 3,704,567 A | * | 12/1972 | Engel | E21B 43/34 95/19 |
| 3,759,324 A | | 9/1973 | Mecusker | |
| 3,802,501 A | * | 4/1974 | Mecusker | B01D 17/0217 166/75.12 |
| 3,970,143 A | * | 7/1976 | Thrash | E21B 36/006 166/53 |
| 4,039,130 A | | 8/1977 | Hogan | |
| 4,369,047 A | | 1/1983 | Arscott et al. | |
| 4,579,565 A | * | 4/1986 | Heath | E21B 43/34 95/15 |
| 4,597,437 A | * | 7/1986 | McNabb | E21B 43/34 166/79.1 |
| 4,824,447 A | * | 4/1989 | Goldsberry | B01D 53/22 166/268 |
| 5,900,137 A | * | 5/1999 | Homan | B01D 17/005 175/206 |
| 6,164,493 A | * | 12/2000 | Shelton, Jr. | E21B 43/34 166/379 |
| 6,197,095 B1 | | 3/2001 | Ditria et al. | |

(Continued)

FOREIGN PATENT DOCUMENTS

| | | | | |
|---|---|---|---|---|
| CA | 2654848 A1 | * | 8/2010 | ............... C10G 1/00 |
| GB | 2346936 A | | 8/2000 | |

*Primary Examiner* — Jennifer H Gay
(74) *Attorney, Agent, or Firm* — Stoel Rives LLP

(57) ABSTRACT

Methods for handling raw oil are disclosed herein. Systems for handling raw oil are disclosed herein. Housing module structures related thereto are disclosed herein.

19 Claims, 6 Drawing Sheets

(56) References Cited

U.S. PATENT DOCUMENTS

| | | | |
|---|---|---|---|
| 7,575,672 B1 * | 8/2009 | Gilmore | B01D 17/0211 210/117 |
| 9,334,722 B1 * | 5/2016 | Taher | E21B 43/017 |
| 2003/0141054 A1 * | 7/2003 | Wade | E21B 43/00 166/250.01 |
| 2003/0168391 A1 * | 9/2003 | Tveiten | B04C 5/26 210/188 |
| 2004/0129426 A1 * | 7/2004 | Edmondson | B01D 19/0042 166/367 |
| 2004/0200621 A1 * | 10/2004 | Ostergaard | E21B 43/36 166/357 |
| 2006/0272503 A1 * | 12/2006 | Adam | B01D 17/0214 95/253 |
| 2007/0277982 A1 * | 12/2007 | Shampine | E21B 43/267 166/308.1 |
| 2008/0161942 A1 * | 7/2008 | Gunnarshaug | E21B 41/00 700/35 |
| 2009/0211960 A1 * | 8/2009 | Nilsen | B01D 17/0205 210/177 |
| 2012/0215365 A1 * | 8/2012 | Nath | E21B 43/34 700/282 |
| 2012/0325751 A1 * | 12/2012 | Renick | E21B 43/26 210/739 |
| 2013/0036671 A1 | 2/2013 | Saccheri et al. | |
| 2013/0269735 A1 * | 10/2013 | Roetzel | E21B 21/062 134/40 |
| 2014/0096836 A1 * | 4/2014 | Romero Maimone | E21B 43/34 137/10 |
| 2014/0096974 A1 * | 4/2014 | Coli | E21B 43/26 166/358 |
| 2014/0335002 A1 * | 11/2014 | Northrop | B01D 53/1425 423/228 |
| 2014/0338904 A1 * | 11/2014 | Kooijman | B01D 53/18 166/279 |
| 2015/0007981 A1 * | 1/2015 | Shomody | E21B 36/00 166/245 |
| 2015/0068754 A1 * | 3/2015 | Coli | E21B 43/26 166/308.1 |
| 2015/0090117 A1 * | 4/2015 | Baggerud | B01D 53/22 95/30 |
| 2015/0345258 A1 * | 12/2015 | Sanborn | E21B 41/005 166/311 |

* cited by examiner

METHODS AND SYSTEMS FOR HANDLING RAW OIL AND STRUCTURES RELATED THERETO

CROSS-REFERENCE TO RELATED APPLICATIONS

This application claims the benefit of the earlier filing date of U.S. Provisional Application No. 62/305,880 filed on Mar. 9, 2016 and titled "METHODS AND SYSTEMS FOR HANDLING RAW OIL AND STRUCTURES RELATED THERETO," the entire contents of this application are hereby incorporated herein by reference in their entirety.

TECHNICAL FIELD

The present disclosure relates generally to oil and gas production. More specifically, the present disclosure relates to methods and systems for handling raw oil, and structures related thereto.

BACKGROUND

Conventional oil and gas production is very capital intensive. Therefore, only high-producing reservoirs are typically considered commercially viable. The well pad of a typical high-producing reservoir will have a processing plant that processes the raw oil, water, and gas into separate pipeline-grade crude oil, pipeline-grade gas, and clean water. For so-called "stranded assets," reservoirs that either have a low overall oil and gas volume or would have a low production rate, the capital and operating costs associated with building a conventional processing plant cannot be justified. Methods and systems for handling raw oil that could allow for economical production of stranded assets would be a welcome addition to the oil and gas industry.

BRIEF DESCRIPTION OF THE DRAWINGS

The embodiments disclosed herein will become more fully apparent from the following description and appended claims, taken in conjunction with the accompanying drawings. The drawings depict primarily generalized embodiments, which embodiments will be described with additional specificity and detail in connection with the drawings in which:

DETAILED DESCRIPTION

Figure 1:
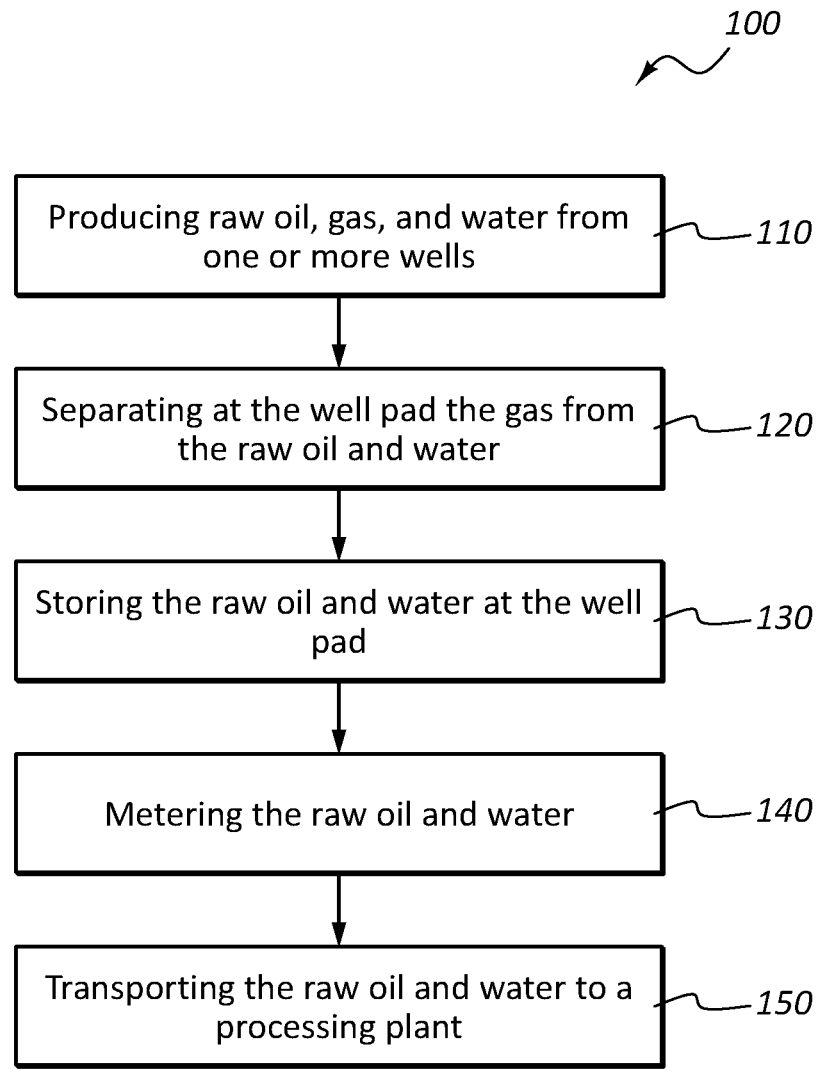
FIG. 1 illustrates one embodiment of a method of handling raw oil.

The present disclosure relates to methods and systems for handling raw oil, and structures related thereto. The methods, systems, and structures disclosed herein may be used for producing oil from what typically would be considered a stranded asset.

The methods of handling raw oil include methods comprising producing raw oil, gas, and water from one or more wells located at a well pad, wherein the raw oil is not pipeline-grade crude oil. The methods further comprise separating at the well pad the gas from the raw oil and water. The methods further comprise transporting the raw oil and water to a processing plant where water and particulate matter are sufficiently removed from raw oil to form pipeline-grade crude oil.

The systems for handling raw oil include oil production systems comprising an oil production module. The oil production module may include a first skid base with a first cyclone separator attached to the first skid base. The first cyclone separator may comprise a first inlet, a first gas outlet, and a first liquid outlet, wherein the first inlet is configured to be operably connected to an oil production manifold operably connected to the one or more wells of a reservoir. The oil production module may further include a second cyclone separator attached to the first skid base. The second cyclone separator may comprise a second inlet, a second gas outlet, and a second liquid outlet, wherein the second inlet is operably connected to the first liquid outlet of the first cyclone separator. The oil production module may further include a separation vessel attached to the first skid base. The separation vessel may comprise a third inlet, a third gas outlet, and a third liquid outlet, wherein the third inlet is operably connected to the second liquid outlet of the second cyclone separator and wherein the third liquid outlet is configured to be operably connected to a liquid raw oil and water piping system.

The structures related to methods and systems for handling raw oil include housing modules. The housing module may comprise a wall section configured to be attached to a skid base. The wall section may have an upper tiltable wall panel and a lower tiltable wall panel. The upper tiltable wall panel and the lower tiltable wall panel may each have a vertical orientation and a horizontal orientation. When in the vertical orientation, the upper tiltable wall panel and the lower tiltable wall panel mate together and define at least a portion of an interior space of the housing module. When in the horizontal orientation, the upper tiltable wall panel and the lower tiltable wall panel increase the interior space of the housing module.

The phrases "attached to," "operably connected to," and "connected to" refer to any form of applicable interaction between two or more entities, such as, for example, mechanical, electrical, magnetic, electromagnetic, fluid, and thermal interaction. Two entities may interact with each other even though they are not in direct contact with each other. For example, two entities may indirectly interact with each other through an intermediate entity.

FIG. 1 illustrates one embodiment of a method 100 of handling raw oil. Step 110 includes producing raw oil, gas, and water from one or more wells. A single well pad may have several wells producing raw oil, gas, and water from the same reservoir. Step 120 includes separating at the well pad the gas from the raw oil and water. Step 130 includes storing the raw oil and water at the well pad. Step 140 includes metering the raw oil and water. Step 150 includes transporting the raw oil and water to a processing plant. It should be understood that step 140 may also be performed earlier in the process. For example, step 140 may be performed prior to step 120 and/or prior to step 130.

An important distinction between the method 100 and conventional oil and gas processing is that produced raw oil is not processed to pipeline-grade crude oil on the well pad. For example, pipeline-grade crude oil typically has less than 0.35% sediment and water, by weight. Likewise, enough dissolved gases have been removed from the oil that pipeline-grade crude oil has a vapor pressure less than 14.5 psig at 105° F. By contrast, the method 100 stores and transports raw oil and water that is not pipeline-grade crude oil. Instead, the raw oil includes more water and/or sediment and/or has a higher vapor pressure than permissible for pipeline-grade crude oil.

In step 110, gas is separated from the raw oil and water. Accordingly, the raw oil is not transported in the same condition as it is produced. The produced raw oil, gas, and water are partially processed prior to transportation. The volume percent of gas produced by the reservoir can be low, such as 30 standard cubic feet of gas per 42 gallons of liquid, or much higher. For example, in step 110, at least about 95%, at least about 96%, at least about 97%, at least about 98%, or at least about 99% of the gas may be separated from the raw oil and water.

The separated gas may be scrubbed, filtered, compressed, and injected into a gas injection well at the well pad. The separated gas may also be flared or combusted to generate heat and/or electricity.

Unlike the gas, the water produced with the raw oil is generally not separated from the raw oil. Thus, significant quantities of water can be transported with the raw oil. During initial production of a well, as much as 40% by volume of the products produced may be water. Generally speaking, over the production life of a well, the water production will increase (i.e., the ratio of water, to gas, to oil will increase). Therefore, the transported raw oil and water may comprise significant quantities of water, such as 30-50% by volume.

One of the benefits of not separating the water from the raw oil is that water treatment equipment is not necessary on the well pad. This can avoid a significant capital expense. Instead, the water can be separated at the processing plant, which has sufficient economies of scale to justify the water treatment equipment capital expense and operating costs.

In some embodiments, such as when water is needed on the well pad for a water injection well, then water treatment equipment could be utilized to clean a portion of the water for injection. In such embodiments, the transported raw oil and water may comprise less than 5% water; however, even in such embodiments, the raw oil would still contain too much water and/or sediment to qualify as pipeline-grade crude oil (e.g., more than 0.35% of one or both by weight). In such embodiments, the well pad would not have the equipment necessary for sufficiently separating the water from the raw oil to result in pipeline-grade crude oil.

In step 130, raw oil and water is stored at the well pad, prior to transport to the processing plant. This is different from conventional oil production in cold climates, such as on the North Slope of Alaska, where raw oil and water are not stored prior to processing to pipeline-grade crude oil and clean water.

In step 130, the raw oil and water may be stored in the same vessel or separate vessels. If stored in separate vessels, the primarily raw water will generally comprise at least about 1%, at least about 2%, at least about 3%, at least about 4%, at least 5%, or at least 10% raw oil, by volume. Likewise, the primarily raw oil will generally comprise at least 1%, at least about 2%, at least about 3%, at least about 4%, at least 5%, or at least 10% water, by volume. This partial separation is not to pipeline-grade specifications. This partial separation may occur if the raw oil and water are partially-separated for metering purposes prior to transport to the processing plant. It may be desirable to store two to five days' worth of raw oil and water production.

As noted above, step 140 may occur at different points in time. Government regulations may dictate when metering occurs. For example, a multiphase meter may be used to meter produced raw oil, gas, and water prior to separation of the gas from the raw oil and water. Metering may also occur after separation of the gas, but prior to storage of the raw oil and water. Metering may also occur during loading of transport vessels.

Step 150 may include hauling the raw oil and water with a tanker truck. One of the benefits of this approach is that the capital and operating expenses associated with building a pipeline are avoided. This may further improve the economics of producing oil from the reservoir and make production economically viable.

The raw oil may also not be desalted or undergo sulfur removal prior to transport to the processing plant, thereby avoiding the capital and operating costs associated with such removal equipment.

The processing plant may or may not be under the control of the owner of the well pad. For example, the processing plant may receive raw oil from other well pads. Additionally, the well pad owner may not own the equipment utilized in performing steps 120 through 150. For example, the equipment used in performing steps 120 and 130 may be leased from a services company to the well pad owner. Likewise, the well pad owner may contract with a trucking company to transport the raw oil and water to the processing plant.

Figure 2:
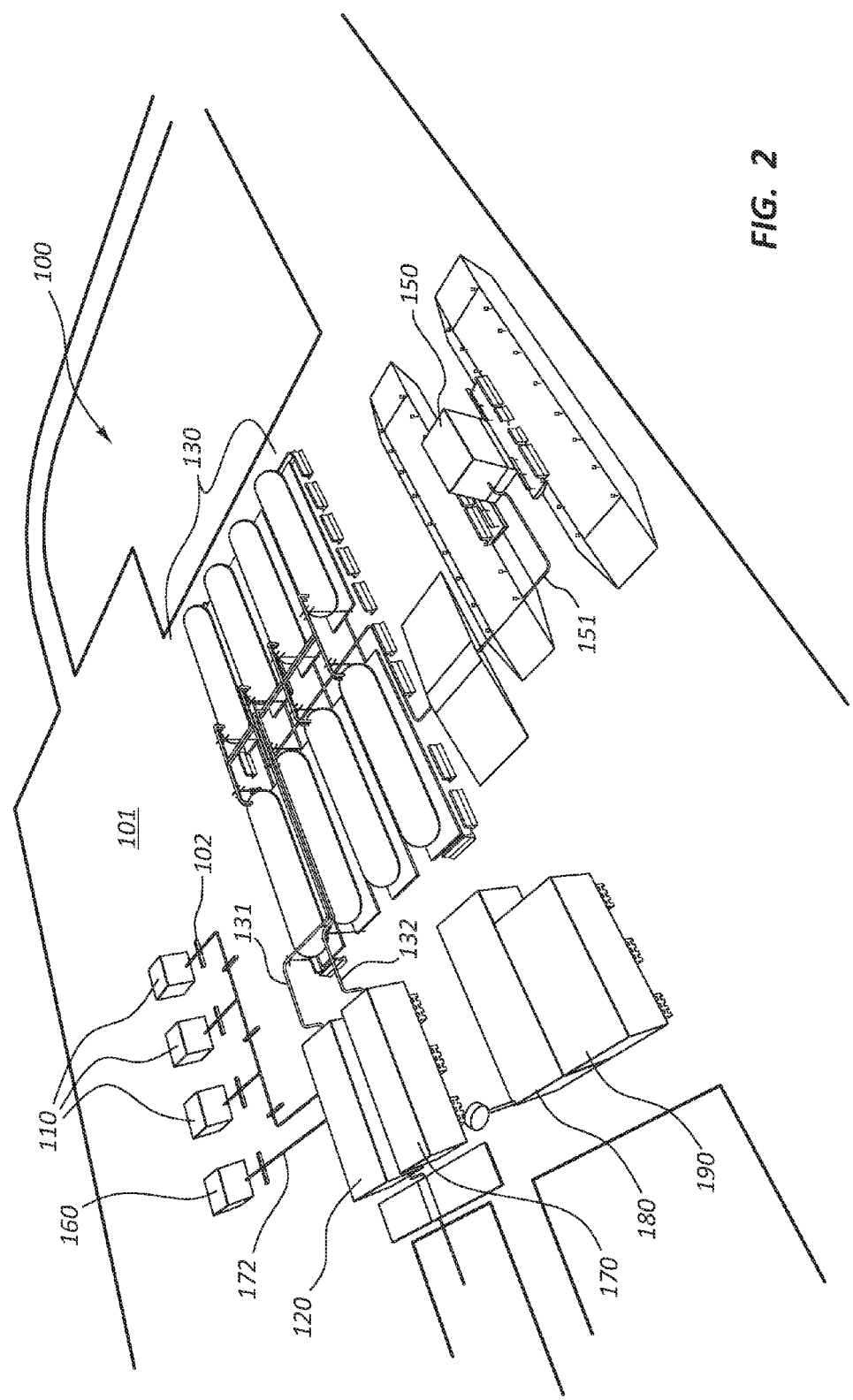
FIG. 2 illustrates one embodiment of an oil production system.

FIG. 2 illustrates one embodiment of an oil production system 100. Oil production system 100 may be used to accomplish the steps of method 100 as discussed above. Exemplary oil production system 100 has three production wells 110 and one gas injection well 160 on a well pad 101. In practice, the well pad 101 may have any number of production wells, gas injection wells, and water injection wells. Exemplary oil production system 100 includes an oil production module 120, a storage tanks 130, a pump module 150, a gas module 170, an electrical control module 180, and a power generation module 190.

Figure 3:
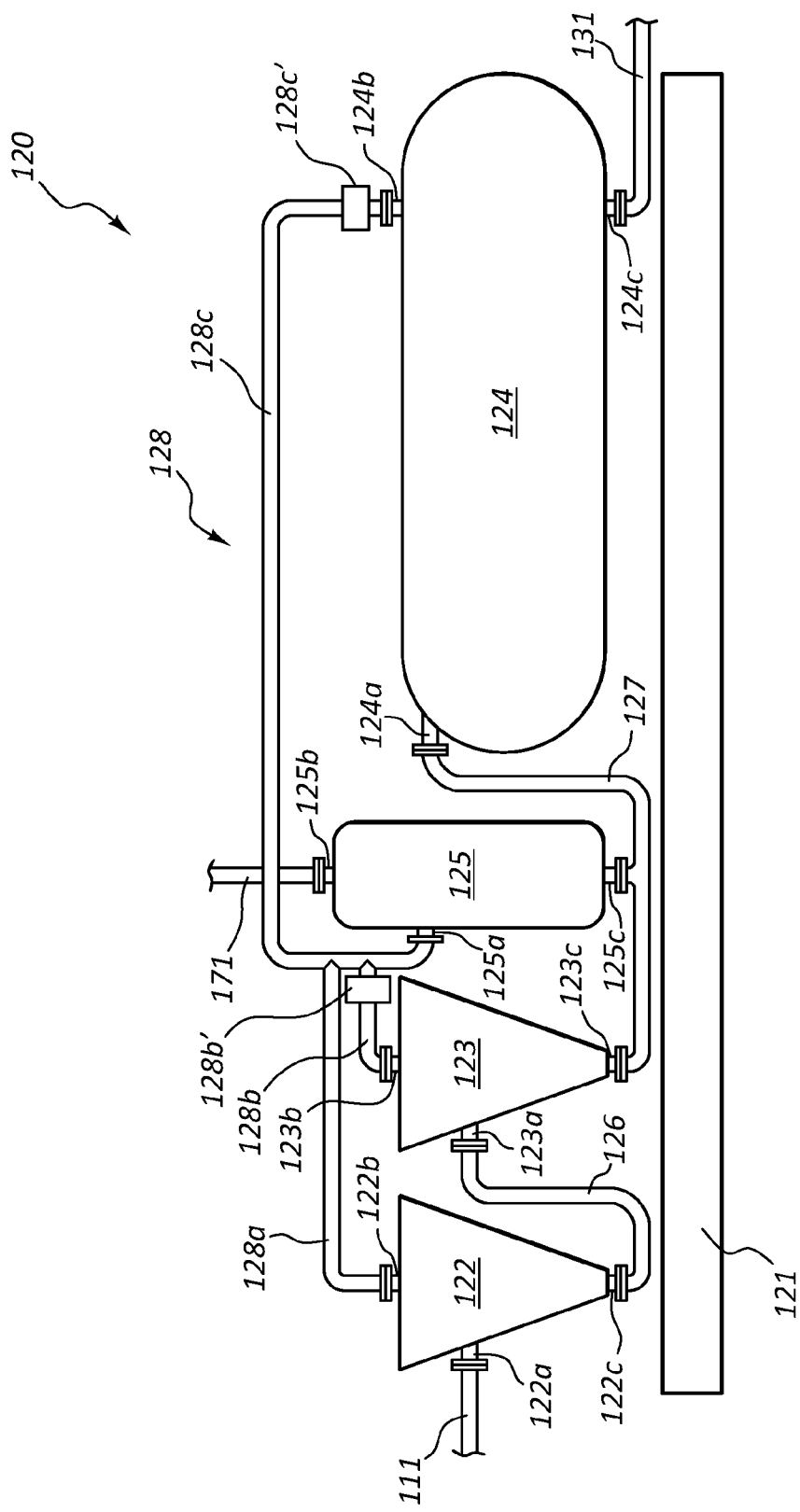
FIG. 3 illustrates one embodiment of an oil production module of the oil production system illustrated in FIG. 2.

FIG. 3 illustrates an exemplary oil production module 120. The oil production module 120 includes a first skid base 121 with a first cyclone separator 122 attached to the first skid base 121. The first cyclone separator 122 has a first inlet 122a, a first gas outlet 122b, and a first liquid outlet 122c. The first inlet 122a is connected to an oil production manifold 111 connected to the production wells 110.

The oil production module 120 has a second cyclone separator 123 attached to the first skid base 121. The second cyclone separator 123 has a second inlet 123a, a second gas outlet 123b, and a second liquid outlet 123c. The second inlet 123a is connected to the first liquid outlet 122c via piping 126.

The oil production module 120 has a separation vessel 124 attached to the first skid base 121. The separation vessel 124 includes a third inlet 124a, a third gas outlet 124b, and a third liquid outlet 124c. The third inlet 124a is connected to the second liquid outlet 123c via piping 127. The third liquid outlet 124c is connected to a liquid raw oil and water piping system 131.

The oil production module 120 has a knockout vessel 125 attached to the first skid base 121. The knockout vessel 125 has a fourth gas inlet 125a, a fourth gas outlet 125b, and a fourth liquid outlet 125c. The fourth gas inlet 125a is connected to the first gas outlet 122b, the second gas outlet 123b, and the third gas outlet 124b via piping 128 (including piping 128a, 128b, and 128c). The fourth gas outlet 125b is connected to the gas module 170 via piping 171. The fourth liquid outlet 125c is connected to the third inlet 124a via piping 127. The knockout vessel may be rated for 500 psi gauge.

In the illustrated embodiment, the oil production module 120 includes a compressor 128b' in line with the piping 128b and a compressor 128c' in line with the piping 128c. The compressors 128b' and 128c' may be present to compensate for pressure differentials between the piping 128 lines. For example, the pressure at the first gas outlet 122b may be about 500 psi gauge, the pressure at the second gas outlet 123b may be about 100 psi gauge, and the pressure at the third gas outlet 124b may be about 10 psi gauge. In that scenario, the compressors 128b' and 128c' could increase the pressure in the pipes 128b and 128c to allow combination of the gas streams. One of ordinary skill in the art, having the benefit of this disclosure, would understand that in addition to or instead of the compressors 128b' and 128c' other mechanisms for combining the gas streams could be used. Likewise, the oil production module 120 may include a variety of pumps, compressors, blowers, valves, vents, and piping.

It should be understood that FIG. 3 is not to scale and that the shape, size, arrangement, orientation of components, and arrangement of inlets and outlets are not intended to limit oil production module 120. For example, first cyclone separator 122 may be larger than second cyclone separator 123, since the majority of the gas may be separated out by the first cyclone separator 122. Therefore, the volume of fluid entering the second cyclone separator 123 will be less than that entering the first cyclone separator 122. Likewise, the geometry of the first and second cyclone separators 122 and 123 may differ from each other. In some embodiments the first and second cyclone separators 122 and 123 may be cylindrical in shape. The first cyclone separator 122 may have an outer diameter of 20 inches and a seam-to-seam length (length of the cylindrical portion) of 72 inches, with a total height of about eight feet. The second cyclone separator 123 may have an outer diameter of 18 inches and a seam-to-seam length of 72 inches, with a total height of about eight feet.

The separation vessel 124 is illustrated as a horizontal vessel, but other configurations could apply. The separation vessel 124 may be a horizontal gravity separator. The separation vessel 124 may differ from conventional gravity separators in a number of ways. For example, since a majority of the gas may have been removed by the first and second cyclone separators 122 and 123, then the separation vessel 124 may not need an internal slug catcher baffle. The separation vessel 124 may include a demister for filtering liquid droplets from gas before the gas exits at the third gas outlet 124b. However, the separation vessel 124 may not need a baffle for separating oil from water. Therefore, the third liquid outlet 124c serves a single liquid outlet for both the raw oil and water, the third liquid outlet 124c. For example, the separation vessel 124 may be a simple cylindrical vessel, such as with a five foot diameter and sixteen foot length.

In some embodiments it may be desirable to not use a custom gravity separator for the separation vessel 124. Therefore, the separation vessel 124 may include a baffle for separating oil from water and separate outlets for the oil and water. In such embodiments, the additional outlet (not illustrated) may also be connected to the liquid raw oil and water piping system 131 so that the raw oil and water are both connected to the same piping that feeds to the storage tanks 130.

In the illustrated embodiment, the piping connections are shown as flanged connections. It should be understood that any piping connection compatible, as applicable, with the oil production manifold 111, the piping 126, 127, 128, 151, 171, and 172, and the liquid raw oil and water piping system 131 may be used. For convenience, the piping is illustrated as having the same diameter. It should be understood that various diameters, as applicable to the pressure and volume, may be used. Likewise, the illustrated layout of the piping is not limiting. One of ordinary skill in the art, having the benefit of this disclosure, would understand that any number of piping layouts may be used to accomplish the connections disclosed herein. Likewise, the functionality disclosed for the inlets, outlets, and piping may be accomplished by multiple inlets, outlets, and pipes in parallel. Furthermore, the piping may be accomplished with steel pipes or other types of pipe or hosing compatible with the requisite pressures and temperatures.

Instruments (not shown) may be attached via threaded or flanged connections to the first and second cyclone separators 122 and 123, the separation vessel 124, and the knockout vessel 125. The instruments may be electrically connected (not shown) to the electrical control module 180. The precision of compressed air control may not be necessary for the system 100, since the raw oil is not processed to pipeline-grade crude oil on the well pad 101. Therefore, the expense of instrument air equipment can be avoided.

The manner of attaching the first and second cyclone separators 122 and 123, the separation vessel 124, and the knockout vessel 125 to the first skid base 121 is not illustrated. One of ordinary skill in the art, having the benefit of this disclosure, would understand that any number of supporting structures (not shown) may be used to attach equipment to the first skid base 121. Likewise, the equipment and supporting structures may be bolted, welded, and/or otherwise attached to the first skid base 121.

The oil production module 120 may include a housing, such as illustrated in FIG. 2, for encapsulating the first and second cyclone separators 122 and 123, the separation vessel 124, and the knockout vessel 125. The first skid base 121 may be part the housing. The oil production module 120 may include fire suppression systems, fire and/or gas leak detection systems, or combinations thereof.

Referring to FIG. 2 again, the liquid raw oil and water piping system 131 feeds the storages tanks 130. In the illustrated embodiment, there are eight storage tanks 130. In practice, the number of storage tanks may be selected to provide a desired amount of storage, which can be calculated from the estimated liquid production volume of the production wells 110. For example, it may be desirable to have sufficient storage capacity to store two to five days' worth of liquids produced by the production wells 110.

The gas module 170 comprises a second skid base (not shown) and at least one gas compressor (not shown) attached to the second skid base. The at least one gas compressor is operably connected to the fourth gas outlet 125b via piping 171 (see FIG. 3). Vent piping 132 connects the storage tanks 130 to the gas module 170 and directs any gases evolved from the storage tanks 130 to the at least one gas compressor of the gas module 170. The gas compressor may be electrically driven, such as with a variable frequency drive. Electricity may be supplied by the power generation module 190. The gas module 170 may include filters and scrubbers as needed to purify the gas prior to compression.

The gas module 170 is operably connected to the gas injection well 160 via piping 172. Alternatively or additionally, gas may be fed to the power generation module 190 for combustion.

Additionally, all or a portion of the gas may be flared instead of injected or used for power generation. For example, the gas module 170 may not be present.

The electrical control module 180 comprises a third skid base (not shown) and a process control system (not shown) attached to the third skid base. The process control system is operably connected to the instrumentation of the first and second cyclone separators 122 and 123, the separation vessel 124, and the knockout vessel 125. The process control system is also operably connected to the instrumentation of the components of the remainder of the system 100, such as the components of the production wells 110, the storage tanks 130, the pump module 150, the injection well 160, the gas module 170, and the power generation module 190.

The power generation module 190 comprises a fourth skid base (not shown) and at least one generator set (not shown) attached to the fourth skid base. The at least one generator set is operably connected to at least one gas compressor of the gas module 170. One example of a generator set is a microturbine, such as a Capstone C1000. Alternative generator sets include internal combustion engine-driven generators. The power generation module 190 may be separately grounded from the electrical control module 180.

The pump module 150 comprises a fifth skid base (not shown) and at least one pump (not shown) attached to the fifth skid base. The at least one pump is connected to the storage tanks 130 via piping 151. The pump may be electrically driven with power supplied by the power generation module 190. A loading rack (not shown) is operably connected to the at least one pump. The loading rack and at least one pump allow for loading tanker trucks with the raw oil and water stored in the storage tanks 130.

Modules other than the oil production module 120 may also include fire suppression systems, fire and/or gas leak detection systems, or combinations thereof.

Metering is not illustrated in FIG. 2. As noted previously, when metering occurs may be governed by government regulations. For example, a multiphase meter may be operably connected to the oil production manifold 111. A gas flow meter may be operably connected to piping 172 to measure gas flow. A liquid flow meter may also be operably connected to the at least one pump of the pump module 150 to measure liquids dispensed by the loading rack to tanker trucks.

The embodiment of system 100 is designed to be temporary in nature. Many of the modules and piping are supported by removable timbers 102. In this exemplary embodiment, the oil production module 120, storage tanks 130, pump module 150, gas module 170, electrical control module 180, and power generation module 190 are each configured to be separately transported, such as with a tractor trailer. The modules may be configured to be joined together onsite, such as the electrical control module 180 and power generation module 190 illustrated in FIG. 2. The modular and transportable nature of the different equipment modules allows for the equipment to be used at multiple well pads, over the service life of the equipment. For example, the oil production module 120, storage tanks 130, pump module 150, gas module 170, electrical control module 180, and power generation module 190 may be used to produce oil from a single well pad for two years or less. The system 100 may be used to economically produce raw oil from stranded assets in cold climates, such as the North Slope of Alaska, where production approaches that might be feasible in warmer climates are not be feasible.

Noticeably absent from FIG. 2 is a desalter system, a sulfur removal system, a sediment removal system, a degassing system, a water treatment system, or any piping that extends off of the well pad 101. While one or more of such systems could be included, it would add to the capital and operating costs of the system 100.

Figure 5:
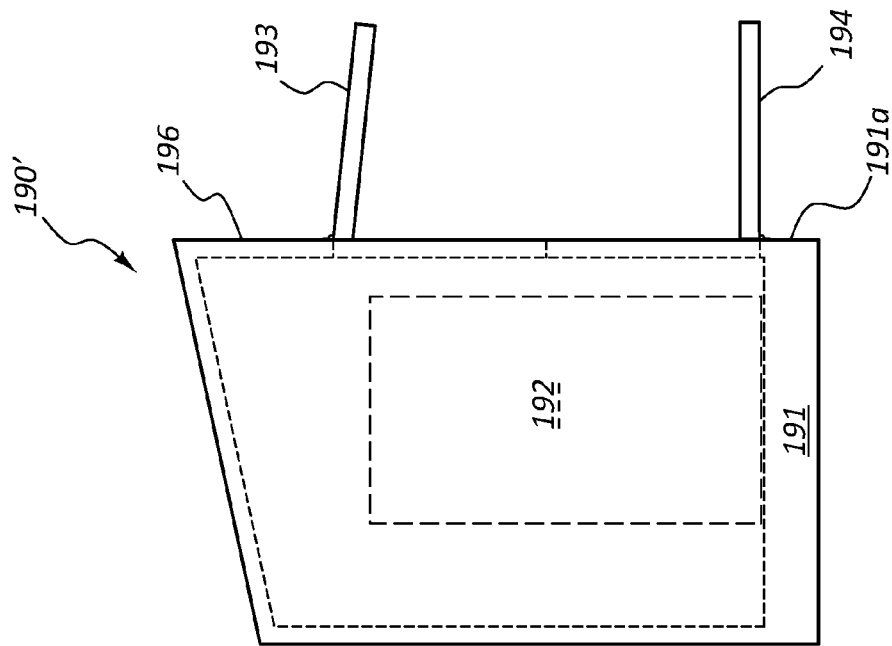
FIG. 5 illustrates an elevation view of the housing module of FIG. 4.
Figure 4:
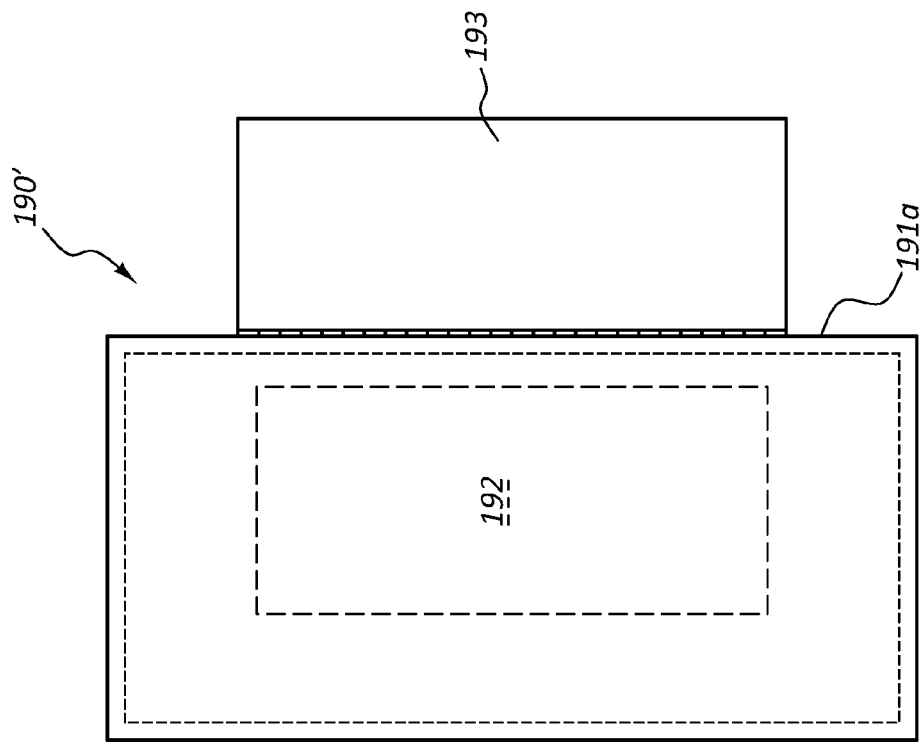
FIG. 4 illustrates a plan view of one embodiment of a housing module.
Figure 6:
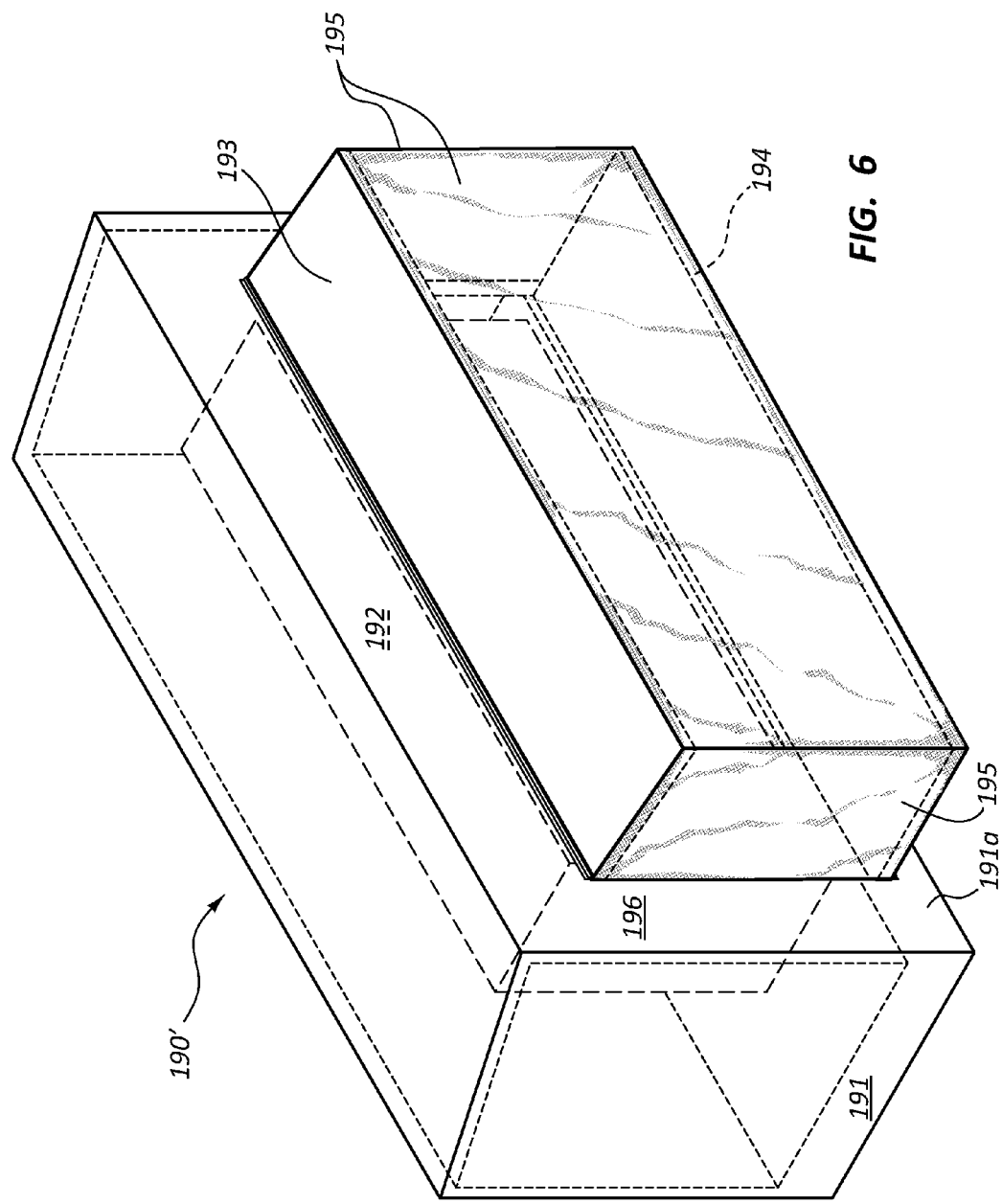
FIG. 6 illustrates an orthographic view of the housing module of FIG. 4.

FIG. 4 illustrates a plan view of one embodiment of a housing module 190'. FIG. 5 illustrates an elevation view and FIG. 6 illustrates an orthographic view. The housing module 190' comprises a wall section 196 attached to a skid base 191. The wall section 196 has an upper tiltable wall panel 193 and a lower tiltable wall panel 194. The upper tiltable wall panel 193 and the lower tiltable wall panel 194 each have a vertical orientation and a horizontal orientation. When in the vertical orientation, the upper tiltable wall panel 193 and the lower tiltable wall panel 194 mate together and define at least a portion of the interior space of the housing module 190'. When in the horizontal orientation, the lower tiltable wall panel 194 increases the footprint of the housing module 190'.

The skid base 191 has a rectangular shape with a first long edge 191a, a second long edge, and two short edges. The skid base 191 may be sized for transport on a tractor-trailer flatbed, same as with the modules of system 100. The wall section 196 is attached to the first long edge 191a of the skid base 191. Equipment 192 (shown in phantom) is mounted on an upper surface of the skid base 191 and proximal to the first long edge 191a. When the upper and lower tiltable wall panels 193 and 194 are in the vertical orientation, then there is insufficient space for an operator to access the equipment 192 along the first long edge 191a. However, when the upper and lower tiltable wall panels 193 and 194 are in the horizontal orientation, then there is sufficient space for an operator to access the equipment 192 along the first long edge 191a, via the opening in the wall section 196 created by opening the upper and lower tiltable wall panels 193 and 194.

One of the benefits of the housing module 190' is that it may have improved transportability and functionality. Many governmental entities regulate the length and width of objects that may be transported on highways. However, it is desirable to transport housing modules as a single unit, to avoid the need for assembly onsite. Therefore, the length and width of the skid base are effectively limited by transportation regulations. At the same time, equipment placed within a housing needs to be accessible on all sides. This can be problematic for large equipment that occupies the majority of the floor space of the skid base.

The housing module 190' addresses these concerns with upper and lower tiltable wall panels 193 and 194 that effectively extend the floor space around the equipment 192. The lower tiltable wall panel 193 becomes a surface that an operator can stand on while working on the side of the equipment 192 adjacent the wall panels. Therefore, equipment 192 can be offset on the surface of the skid base 191 and placed adjacent the wall section which has the tiltable wall panels. This provides walking space on three sides of the equipment 192 within the housing and along the first long edge 191a, when the upper and lower tiltable wall panels 193 and 194 are opened up.

In the illustrated embodiment, the length of the upper and lower tiltable wall panels 193 and 194 is longer than the length of the equipment 192. Likewise, the combined height of the upper and lower tiltable wall panels 193 and 194, when in the vertical orientation, is higher than the height of the equipment 192. This may be accomplished by designing the upper and lower tiltable wall panels 193 and 194 to accommodate the desired equipment 192. For example, the equipment 192 could be at least one generator set, such as an enclosure comprising microturbines. Accordingly, housing module 190' could be used as the housing for the power generation module 190 of the system 100.

In the illustrated embodiment, the housing module 190' comprises a flexible material 195, such as heavy canvas, configured to extend from the edges of the upper tiltable wall panel 193 to the edges of the lower tiltable wall panel 194 to form temporary walls when the upper tiltable wall panel 193 and the lower tiltable wall panel 194 are in the horizontal orientation.

It should be understood that the "vertical orientation" places the upper and lower tiltable wall panels 193 and 194 parallel with the remainder of the wall section 196. Therefore, even if the wall section 196 is not vertically-oriented, if the upper and lower tiltable wall panels 193 and 194 are mated together in the closed configuration, then that constitutes the same thing as being in the "vertical orientation."

Likewise, it should be understood that the "horizontal orientation" places the upper and lower tiltable wall panels 193 and 194 roughly perpendicular with the remainder of the wall section 196. The "horizontal orientation" includes plus or minus 30 degrees of horizontal. For example, the horizontal orientation of the upper tiltable wall panel section 193 illustrated in FIG. 6 qualifies as being in the "horizontal orientation." Additionally, even if the wall section 196 is not vertically-oriented, if the upper and lower tiltable wall panels 193 and 194 are in the open configuration, then that constitutes the same thing as being in the "horizontal orientation."

The lower tiltable wall panel 194 may include structural reinforcement sufficient to support a weight of an operator and associated equipment and small tools. The structural reinforcement may be sufficient to avoid damage to any insulation of the lower tiltable wall panel 194 from the weight of the operator. All of the walls of the housing module 190' may be insulated, which further reduces the footprint of the upper surface of the skid base 191 available for the equipment 192. The insulation may be of particular importance in areas such as the North Slope of Alaska. Likewise, all of the modules of the system 100 may have insulated walls.

Figure 7:
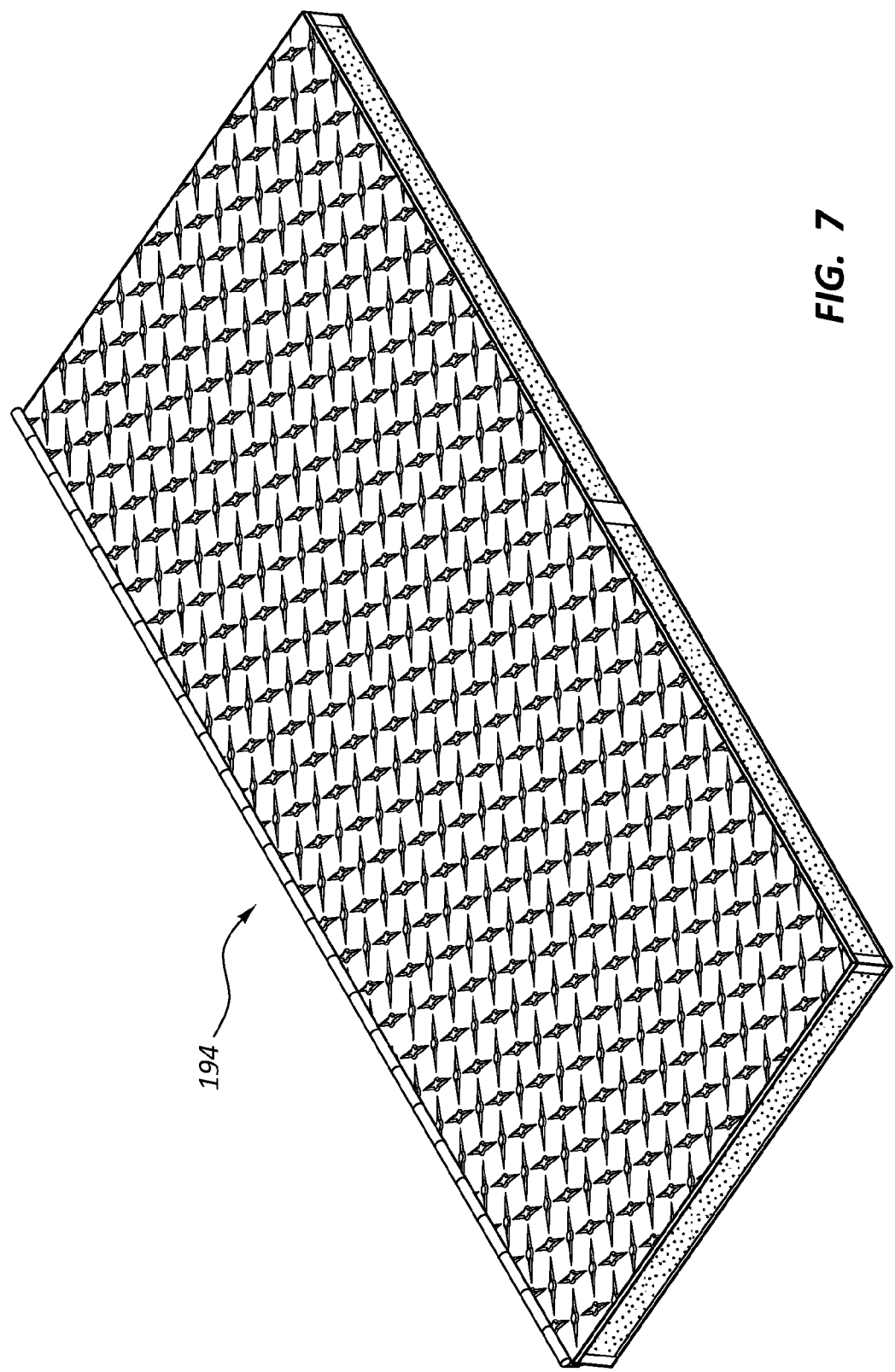
FIG. 7 illustrates an orthographic view of a lower tiltable wall panel of the housing module of FIG. 4.

FIG. 7 illustrates one embodiment of the upper surface of the lower tiltable wall panel 194, as when viewed in the horizontal orientation. In the illustrated embodiment, the upper surface comprises grating to provide traction for operator walking.

One of ordinary skill in the art, having the benefit of this disclosure, would understand that any number of hinge mechanisms may be used to allow movement of the upper tiltable wall panel 193 and the lower tiltable wall panel 194. Likewise, the housing module 190' includes a door (not shown) and may include ventilation and other permanent access ports. The upper tiltable wall panel 193 and the lower tiltable wall panel 194 will generally only be open on a temporary basis.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, and having the benefit of this disclosure, that changes may be made to the details of the above-described embodiments without departing from the underlying principles of the disclosure herein.

The invention claimed is:

1. A method of handling raw oil, the method comprising:
producing raw oil, gas, and water from one or more wells located at a well pad, wherein the raw oil is not pipeline-grade crude oil;
separating the gas from the raw oil and water at the well pad using at least one cyclone separator with an outlet operably connected to a separation vessel, wherein the gas is separated form the raw oil and water without purifying the water to produce process-suitable or discharge-suitable water; and
transporting the raw oil and water to a processing plant where water and particulate matter are sufficiently removed from raw oil to form pipeline-grade crude oil.

2. The method of claim 1, further comprising storing the raw oil and water at the well pad prior to transporting the raw oil and water to the processing plant.

3. The method of claim 1, wherein transporting the raw oil and water comprises hauling the raw oil and water with a tanker truck.

4. The method of claim 1, wherein the processing plant also receives raw oil from other well pads.

5. The method of claim 1, wherein separating at the well pad the gas from the raw oil and water comprises separating about 95% to about 99% of the gas.

6. The method of claim 1, wherein salts have not been removed from the raw oil prior to transport.

7. The method of claim 1, wherein separating at the well pad the gas from the raw oil and water comprises feeding produced raw oil, gas, and water to a first inlet of a first of the at least one cyclone separators of an oil production module, wherein the oil production module comprises:
a first skid base;
the first cyclone separator attached to the first skid base, the first cyclone separator comprising the first inlet, a first gas outlet, and a first liquid outlet, wherein the first inlet is configured to be operably connected to an oil production manifold;
a second of the at least one cyclone separators attached to the first skid base, the second cyclone separator comprising a second inlet, a second gas outlet, and a second liquid outlet, wherein the second inlet is operably connected to the first liquid outlet of the first cyclone separator; and
the separation vessel attached to the first skid base, the separation vessel comprising a third inlet, a third gas outlet, and a third liquid outlet, wherein the third inlet is operably connected to the second liquid outlet of the second cyclone separator and wherein the third liquid outlet is configured to be operably connected to a liquid raw oil and water piping system.

8. An oil production system comprising:
an oil production module comprising:
a first skid base;
a first cyclone separator attached to the first skid base, the first cyclone separator comprising a first inlet, a first gas outlet, and a first liquid outlet, wherein the first inlet is configured to be operably connected to an oil production manifold;
a second cyclone separator attached to the first skid base, the second cyclone separator comprising a second inlet, a second gas outlet, and a second liquid outlet, wherein the second inlet is operably connected to the first liquid outlet of the first cyclone separator; and a separation vessel attached to the first skid base, the separation vessel comprising a third inlet, a third gas outlet, and a third liquid outlet, wherein the third inlet is operably connected to the second liquid outlet of the second cyclone separator and wherein the third liquid outlet is configured to be operably connected to a liquid raw oil and water piping system; and wherein the system does not include a water treatment system for purifying water produced with oil to produce process-suitable or discharge-suitable water.

9. The system of claim 8, wherein the oil production module further comprises a knockout vessel attached to the first skid base, the knockout vessel comprising a fourth gas inlet, a fourth gas outlet, and a fourth liquid outlet, wherein the fourth gas inlet is operably connected to the first gas outlet, the second gas outlet, and the third gas outlet and wherein the fourth liquid outlet is configured to be operably connected to the third inlet of the separation vessel.

10. The system of claim 8, wherein the separation vessel comprises a horizontal vessel.

11. The system of claim 8, wherein all instruments in the system are controlled electrically and are not air controlled.

12. The system of claim 8, wherein the system does not include a desalter system for removing salt from raw oil to produce pipeline-grade crude oil.

13. The system of claim 8, wherein the system does not include a sulfur removal system for removing sulfur from raw oil to produce pipeline-grade crude oil.

14. The system of claim 8, wherein the system does not have piping that extends off of a well pad where the system is assembled.

15. The system of claim 8, further comprising a gas module comprising:
   a second skid base; and
   at least one gas compressor attached to the second skid base, the at least one gas compressor configured to be operably connected to a fourth gas outlet of a knockout vessel of the oil production module.

16. The system of claim 8, further comprising an electrical control module comprising:
   a third skid base; and
   a process control system attached to the third skid base, the process control system configured to be operably connected to the first cyclone separator, the second cyclone separator, and the separation vessel of the oil production module.

17. The system of claim 8, further comprising a power generation module comprising:
   a fourth skid base; and
   at least one generator set attached to the fourth skid base, the at least one generator set configured to be operably connected to at least one gas compressor of a gas module.

18. The system of claim 8, further comprising at least one storage tank configured to be operably connected to the liquid raw oil and water piping system.

19. The system of claim 8, further comprising a pump module comprising:
   a fifth skid base; and
   at least one pump attached to the fifth skid base, the at least one pump configured to be operably connected to at least one storage vessel.

* * * * *